N. C. MERRILL.
BAKE PAN.
APPLICATION FILED MAY 9, 1916.
1,226,353.
Patented May 15, 1917.
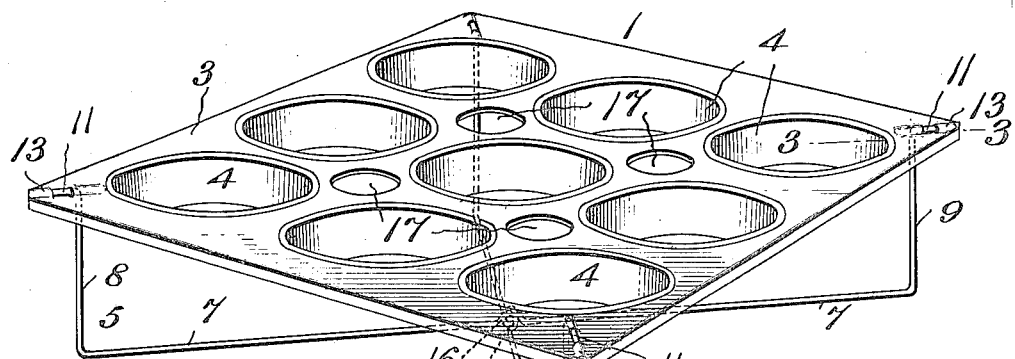
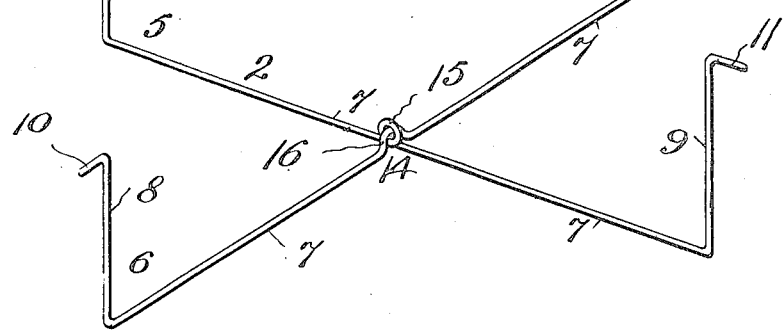
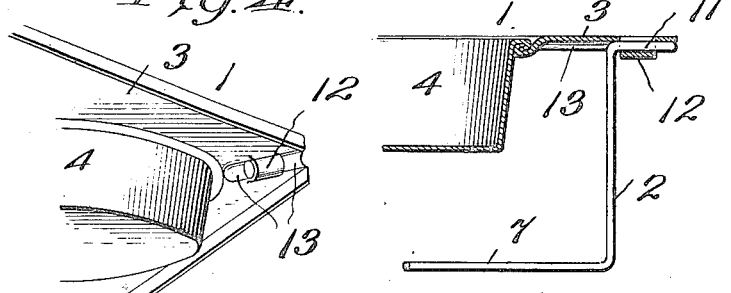
Inventor
Nathaniel C. Merrill,
By his Attorney

UNITED STATES PATENT OFFICE.

NATHANIEL C. MERRILL, OF NEW YORK, N. Y.

BAKE-PAN.

1,226,353.  Specification of Letters Patent.  Patented May 15, 1917.

Application filed May 9, 1916. Serial No. 96,282.

*To all whom it may concern:*

Be it known that I, NATHANIEL C. MERRILL, a citizen of the United States, residing at No. 200 West Ninety-sixth street, New York city, State of New York, have invented certain new and useful Improvements in Bake-Pans; and I do hereby declare the following to be a full, clear, and exact description of the invention, such as will enable others skilled in the art to which it appertains to make and use the same.

This invention relates to pans or like articles employed for baking purposes and has for its general object to permit the proper circulation of the currents of heat entirely around the pan when the same is placed in an oven, so as to reduce to a minimum the liability of the contents of the pan from becoming burned.

It is the further aim of the present invention to provide a bake pan which will, when in use, subject substantially all portions of the contents of the pan to an even temperature so that one glancing at the contents of the pan during baking may readily determine when the same is baked to their entire satisfaction.

And to these ends the invention consists in providing a bake pan with a series of air circulating openings, and a means for supporting the pan above a heating surface whereby to permit the proper circulation of heat entirely around the pan.

With these and other objects in view the invention consists of the novel details of construction and arrangement of parts as are illustrated in the accompanying drawings forming a part of this specification, the novelty of such construction being particularly pointed out in the appended claims.

In the drawings, Figure 1 is a perspective view of my improved bake pan.

Fig. 2 is a detail perspective view of the support.

Fig. 3 is a cross sectional view taken on the line 3—3 of Fig. 1, and

Fig. 4 is a fragmentary inverted perspective view of one corner of the pan.

Referring to the drawings in detail, 1 designates a bake pan which may be of any suitable construction, and 2 designates the means for supporting the pan above a heating surface.

The bake pan herein shown is of the well known form for baking muffins and comprises the rectangular shaped flat top 3 and a plurality of circular cups 4.

The means for supporting the pan is preferably in the nature of a wire frame and consists of a pair of transversely disposed U-shaped bars 5 and 6 each of which is formed of a single piece of wire and comprises the base or cross pieces 7 and upwardly projecting and vertically disposed free end portions 8 and 9. These end portions are arranged so as to form bearing supports for the pan and are of a sufficient length to permit the pan to be supported from the floor of an oven a sufficient distance to effect the proper circulation of heat thereunder. The ends of the upright portions are bent outwardly to provide fingers 10 and 11 for engaging with the sockets 12 provided in the corners of the pan on the underside of the top thereof. The sockets are formed by upstriking a portion of the top of the pan as clearly shown in Fig. 4, and to effect a neat and substantial fit of the fingers within the sockets it will be observed that the top of the pan, on each side of the sockets, is also provided with small depressions 13 into which the fingers fit.

The bars 7 and 8 are crossed at their intermediate portions and interlocked one with the other as indicated at 14. The interlocking of the bars is accomplished by providing one of the bars with an eyelet 15 and the other of the bars with an offset or loop portion 16 which is passed through the eyelet as shown. By pivotally connecting or interlocking the bars in this manner it is obvious that when the support is detached from the pan the bars may be swung in parallel relation to each other or they may be detached from each other so that the bake pan may be wrapped to present a relatively small package.

By forming the support in a cruciform shape, as shown, it is obvious that when the bake pan is inserted into an oven provided with a grating it will be practically impossible for the pan to assume an irregular position as the bars 7 will cross the grate diagonally.

Air circulating openings 17 are provided in the top of the pan, as shown in Fig. 1, in order to allow currents of heat to pass between the cups 4 so as to further facilitate all portions of the contents of the pan being subjected to an even temperature during the process of baking.

It is obvious that those skilled in the art may vary the details of construction and arrangement of parts without departing from the spirit of my invention, and therefor, I do not wish to be limited to such features, except as may be required by the claims.

What I claim is:—

1. A bake pan and means for supporting the pan above a heating surface and comprising a pair of transversely disposed U shaped bars pivotally connected at their central portion, said bars having their free ends bent outwardly to provide fingers for engaging with the pan.

2. A bake pan having air circulating openings formed therein and means for supporting the pan above a heating surface and comprising a pair of transversely disposed U shaped bars pivotally connected at their central portion, said bars having their free ends bent outwardly to provide fingers for engaging with the pan.

3. A bake pan provided with a plurality of sockets, and means for supporting the pan above a heating surface and comprising a pair of transversely disposed U shaped bars pivotally connected at their central portion, said bars having their free ends bent outwardly to provide fingers for engaging the sockets of the pan.

In testimony whereof, I have affixed my signature in presence of two witnesses.

NATHANIEL C. MERRILL.

Witnesses:
H. G. MITTELSTAEDT,
C. E. PECK.